US011811435B2

(12) United States Patent
Yamaguchi et al.

(10) Patent No.: US 11,811,435 B2
(45) Date of Patent: Nov. 7, 2023

(54) SEMICONDUCTOR CHIP AND RECEIVING APPARATUS

(71) Applicant: Sony Semiconductor Solutions Corporation, Atsugi (JP)

(72) Inventors: Toshihiro Yamaguchi, Atsugi (JP); Hiroshi Shono, Atsugi (JP)

(73) Assignee: Sony Semiconductor Solutions Corporation, Atsugi (JP)

( * ) Notice: Subject to any disclaimer, the term of this patent is extended or adjusted under 35 U.S.C. 154(b) by 0 days.

(21) Appl. No.: 17/606,546

(22) PCT Filed: Apr. 27, 2020

(86) PCT No.: PCT/JP2020/017980
§ 371 (c)(1),
(2) Date: Oct. 26, 2021

(87) PCT Pub. No.: WO2020/226090
PCT Pub. Date: Nov. 12, 2020

(65) Prior Publication Data
US 2022/0209797 A1 Jun. 30, 2022

(30) Foreign Application Priority Data
May 9, 2019 (JP) ................................ 2019-088934

(51) Int. Cl.
*H04B 1/00* (2006.01)
*H04B 1/26* (2006.01)
(52) U.S. Cl.
CPC ........... *H04B 1/0057* (2013.01); *H04B 1/006* (2013.01); *H04B 1/26* (2013.01)
(58) Field of Classification Search
CPC ........ H04B 1/0057; H04B 1/006; H04B 1/26; H04N 21/426
See application file for complete search history.

(56) References Cited

U.S. PATENT DOCUMENTS 5,243,415 A * 9/1993 Vance .................... H04N 5/765
348/E5.093
5,302,956 A * 4/1994 Asbury ................. G01S 13/325
342/70
(Continued)

FOREIGN PATENT DOCUMENTS

CN 1599245 A 3/2005
CN 1901657 A 1/2007
(Continued)

OTHER PUBLICATIONS

International Search Report dated Jul. 14, 2020 in PCT/JP2020/017980 filed Apr. 27, 2020, 2 pages.

*Primary Examiner* — Jinsong Hu
*Assistant Examiner* — Rui M Hu
(74) *Attorney, Agent, or Firm* — Oblon, McClelland, Maier & Neustadt, L.L.P.

(57) ABSTRACT

The present technology relates to a semiconductor chip and a receiving apparatus capable of suppressing increases in size and cost due to circuit complexity.

A tuner includes an RF input terminal to which an RF signal of terrestrial broadcasting is input, a first-IF input terminal to which a first-IF signal of satellite digital broadcasting is input, a first filter that filters a signal in a frequency band lower than a predetermined frequency, a second filter that filters a signal in a frequency band equal to or higher than the predetermined frequency, and a switch that causes the RF signal to be input to the first filter or to the second filter by switching according to a frequency of the RF signal, and causes the first-IF signal to be input to the first filter or to the second filter by switching according to a frequency of the first-IF signal. The present technology may be applied to a broadcast receiving system.

10 Claims, 10 Drawing Sheets

(56) References Cited

U.S. PATENT DOCUMENTS

| | | | | |
|---|---|---|---|---|
| 5,774,194 | A * | 6/1998 | Armbruster | H03D 3/242 455/314 |
| 5,809,405 | A * | 9/1998 | Yamaura | H04B 1/48 455/275 |
| 5,926,744 | A * | 7/1999 | Fukuzawa | H04N 7/20 725/68 |
| 6,020,936 | A * | 2/2000 | Brekelmans | H03J 5/244 348/553 |
| 6,044,251 | A * | 3/2000 | Brekelmans | H03J 5/244 455/142 |
| 9,231,609 | B1 * | 1/2016 | Petrovic | H03B 5/30 |
| 9,450,665 | B2 * | 9/2016 | Sampson | H04B 1/006 |
| 2001/0041532 | A1 * | 11/2001 | Tomasz | H04B 1/30 348/E7.093 |
| 2002/0081987 | A1 * | 6/2002 | Yoshida | H04B 1/406 455/552.1 |
| 2002/0102945 | A1 * | 8/2002 | Lee | H04B 1/52 455/313 |
| 2003/0133049 | A1 * | 7/2003 | Cowley | H03J 5/246 348/731 |
| 2003/0179723 | A1 * | 9/2003 | Novak | H04N 7/104 370/480 |
| 2004/0038660 | A1 * | 2/2004 | He | H04B 7/0814 455/272 |
| 2004/0060065 | A1 * | 3/2004 | James | H04B 7/18523 725/71 |
| 2004/0235415 | A1 * | 11/2004 | Atarashi | H04H 40/90 455/334 |
| 2004/0266379 | A1 * | 12/2004 | Woo | H04B 1/0057 455/150.1 |
| 2005/0190777 | A1 * | 9/2005 | Hess | H04H 20/28 725/68 |
| 2005/0265084 | A1 * | 12/2005 | Choi | H04N 5/44 365/189.04 |
| 2006/0031894 | A1 * | 2/2006 | Petruzzelli | H04H 40/90 725/100 |
| 2006/0048197 | A1 * | 3/2006 | Petruzzelli | H04N 21/4622 725/38 |
| 2007/0242784 | A1 * | 10/2007 | Sampson | H04B 7/0871 375/347 |
| 2008/0211564 | A1 * | 9/2008 | Clemens | H04B 1/0057 327/365 |
| 2009/0064239 | A1 * | 3/2009 | Hara | H04N 21/4382 725/68 |
| 2009/0091663 | A1 * | 4/2009 | Toh | H04B 1/26 455/143 |
| 2010/0045874 | A1 * | 2/2010 | Hafemeister | H04N 21/42638 348/731 |
| 2010/0260082 | A1 * | 10/2010 | Lum | H04B 1/0057 370/297 |
| 2010/0291946 | A1 * | 11/2010 | Yamakawa | H04H 40/18 455/454 |
| 2011/0221973 | A1 * | 9/2011 | Hung | H04N 21/41422 348/731 |
| 2013/0303097 | A1 * | 11/2013 | Sasho | H04B 1/0064 455/188.1 |
| 2014/0024329 | A1 * | 1/2014 | Khlat | H04B 1/0057 455/307 |
| 2014/0035699 | A1 * | 2/2014 | Zeng | H04B 1/0057 333/132 |
| 2014/0036765 | A1 * | 2/2014 | Fujimura | H04B 7/18515 370/316 |
| 2014/0211890 | A1 * | 7/2014 | Adnani | H04B 1/06 375/350 |
| 2014/0329475 | A1 * | 11/2014 | Ella | H04L 5/14 455/77 |
| 2015/0382049 | A1 * | 12/2015 | Fujii | H04N 5/46 348/706 |
| 2016/0112072 | A1 * | 4/2016 | Bauder | H04B 1/005 370/297 |
| 2016/0261901 | A1 * | 9/2016 | Petrovic | H04N 21/6168 |
| 2018/0048308 | A1 * | 2/2018 | Oshita | H03K 17/693 |
| 2018/0152172 | A1 * | 5/2018 | Takeuchi | H04B 1/0057 |
| 2018/0152955 | A1 * | 5/2018 | Park | H04W 72/1215 |
| 2018/0337701 | A1 * | 11/2018 | Tsai | H04B 1/1027 |
| 2019/0036217 | A1 * | 1/2019 | Presti | H04B 1/0064 |
| 2019/0123770 | A1 * | 4/2019 | Pehlke | H04B 7/08 |
| 2020/0177214 | A1 * | 6/2020 | Nagumo | H03F 3/19 |
| 2020/0220635 | A1 * | 7/2020 | Tahara | H03K 17/164 |
| 2020/0366323 | A1 * | 11/2020 | Tsuda | H04B 1/0078 |
| 2021/0013910 | A1 * | 1/2021 | Ono | H04B 1/04 |
| 2021/0175940 | A1 * | 6/2021 | Yang | H04B 7/0691 |
| 2021/0218424 | A1 * | 7/2021 | Pehlke | H04B 1/006 |
| 2021/0250054 | A1 * | 8/2021 | Tanaka | H03F 3/189 |
| 2021/0351903 | A1 * | 11/2021 | Mori | H04B 1/0064 |
| 2022/0021510 | A1 * | 1/2022 | Tahara | H04B 1/0057 |
| 2022/0271790 | A1 * | 8/2022 | Sakurai | H04B 1/48 |

FOREIGN PATENT DOCUMENTS

| | | |
|---|---|---|
| CN | 105122825 A | 12/2015 |
| EP | 2 963 936 A1 | 1/2016 |
| EP | 1 768 269 B1 | 6/2016 |
| JP | 2002247461 A | 8/2002 |
| JP | 2006304016 A | 11/2006 |
| JP | 2013-31149 A | 2/2013 |
| JP | 2014-171058 A | 9/2014 |
| JP | 2015-167324 A | 9/2015 |
| JP | 2016-46790 A | 4/2016 |
| WO | WO 2018/037687 A1 | 3/2018 |

* cited by examiner

SEMICONDUCTOR CHIP AND RECEIVING APPARATUS

TECHNICAL FIELD

The present technology relates to a semiconductor chip and a receiving apparatus, and more particularly, to a semiconductor chip and a receiving apparatus capable of suppressing increases in size and cost due to circuit complexity.

BACKGROUND ART

At present, terrestrial digital broadcasting and satellite digital broadcasting digitized from analog broadcasting have been widespread all over the world.

In a case of providing a function of receiving broadcast signals broadcasted in different frequency bands, such as terrestrial digital broadcasting and satellite digital broadcasting, in one circuit, the overall circuit scale tends to increase when each receiving function is separately implemented. In a case of making such a circuit into a large-scale integration (LSI), a layout area increases.

In view of the above, there has been disclosed a technique of reducing a circuit scale by sharing a predetermined circuit using a circuit having both a receiving function of terrestrial digital broadcasting and a receiving function of satellite digital broadcasting.

Patent Document 1 discloses a technique of sharing a local oscillator or a phase locked loop (PLL) circuit that generates an oscillation signal, which is one of two signals to be input to a frequency conversion circuit (mixer) having a function of frequency conversion.

Patent Document 2 discloses a technique of sharing a frequency conversion circuit, a filter that limits a signal band of a signal having been subject to frequency conversion, and the like.

CITATION LIST

Patent Document

Patent Document 1: Japanese Patent Application Laid-Open No. 2013-031149
Patent Document 2: Japanese Patent Application Laid-Open No. 2015-167324

SUMMARY OF THE INVENTION

Problems to be Solved by the Invention

The frequencies of the currently actually operated terrestrial and cable digital broadcasting are 42 MHz to 1002 MHz, and the frequencies of satellite digital broadcast waves are approximately 950 MHz to 3300 MHz. With the expansion of Internet services, services with a frequency range expanded from the current frequency range are about to be used, such as being used for CATV Internet services (DOCSIS, etc.) in a case of cable digital broadcasting, and being used as support for a wideband LNB in a case of satellite digital broadcasting.

However, in a case of receiving a frequency of digital broadcasting having a frequency band wider than the current frequency band, naturally, a broadcast receiving apparatus capable of receiving up to a broadband frequency is newly required instead of the conventional broadcast receiving apparatus.

The present technology has been conceived in view of such a situation, and aims to suppress increases in size and cost due to circuit complexity.

Solutions to Problems

A semiconductor chip according to one aspect of the present technology includes an RF input terminal to which an RF signal of terrestrial broadcasting is input, a first-IF input terminal to which a first-IF signal of satellite digital broadcasting is input, a first filter that filters a signal in a frequency band lower than a predetermined frequency, a second filter that filters a signal in a frequency band equal to or higher than the predetermined frequency, and a switch that causes the RF signal to be input to the first filter and to the second filter by switching according to a frequency of the RF signal, and causes the first-IF signal to be input to the first filter and to the second filter by switching according to a frequency of the first-IF signal.

In the present technology, RF signals of terrestrial broadcasting are input through the RF input terminal. First-IF signals of satellite digital broadcasting are input through the first-IF input terminal. Signals in a frequency band lower than a predetermined frequency are filtered by the first filter. Signals in a frequency band equal to or higher than the predetermined frequency are filtered by the second filter. The RF signals are input to the first filter and to the second filter with the switch being switched according to the frequency of the RF signals, and the first-IF signals are input to the first filter and to the second filter with the switch being switched according to the frequency of the first-IF signals.

MODE FOR CARRYING OUT THE INVENTION

Hereinafter, an embodiment for implementing the present technology will be described. Descriptions will be given in the following order.

<1. Overview>
<2. Broadcast Receiving System>
<3. Details of Tuner>
<4. Variations>
<5. Others>

1. Overview

<Exemplary Configuration of Conventional Tuner>

Figure 1:
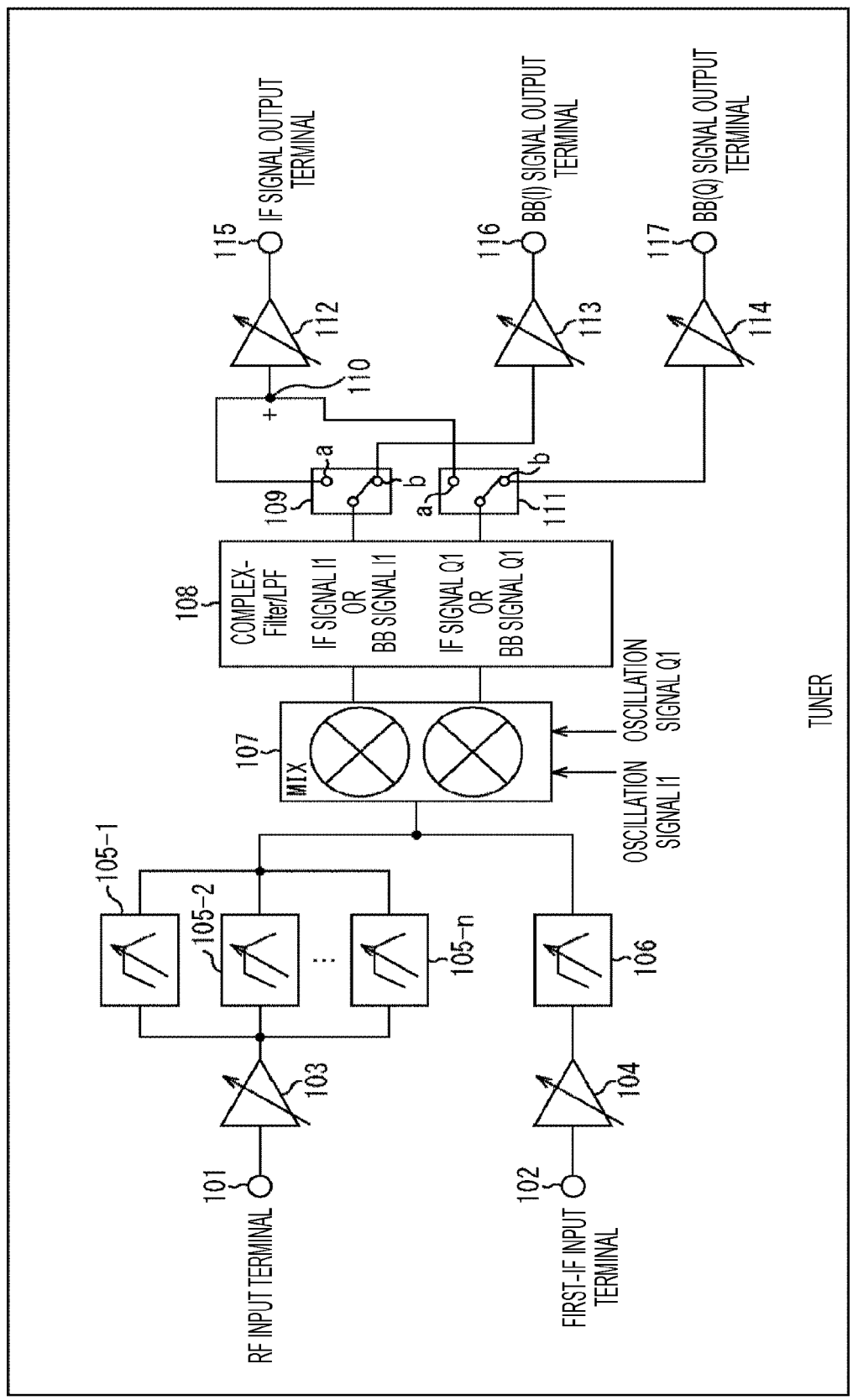
FIG. 1 is a diagram illustrating an exemplary configuration of a conventional tuner.

FIG. 1 is a diagram illustrating an exemplary configuration of a conventional tuner.

The tuner of FIG. 1 is a tuner to be used in a broadcast receiving system that receives broadcast signals of terrestrial digital broadcasting and cable digital broadcasting and broadcast signals of satellite digital broadcasting.

Note that a frequency band of RF signals of the terrestrial digital broadcasting and a frequency band of RF signals of the cable digital broadcasting are close frequency bands, and substantially the same processing is performed on the RF signals of the terrestrial digital broadcasting and the RF signals of the cable digital broadcasting. Therefore, hereinafter, the terrestrial digital broadcasting and the cable digital broadcasting will be collectively called terrestrial broadcasting in a case where it is not particularly necessary to distinguish them.

The tuner includes an RF input terminal 101, a first-IF input terminal 102, RF voltage gain amplifiers (VGAs) (RFVGAs) 103 and 104, RF filters 105-1 to 105-n, an RF filter 106, and a mixer (MIX) 107. Furthermore, the tuner includes a complex-filter/low-pass-filter (LPF) 108, a switch 109, an IQ combiner 110, a switch 111, an IF VGA (IFVGA) 112, BB VGAs (BBVGAs) 113 and 114, an IF signal output terminal 115, a BB(I) signal output terminal 116, and a BB(Q) signal output terminal 117.

The RF input terminal 101 receives RF signals, which are terrestrial broadcast signals supplied from a terrestrial broadcasting antenna (not illustrated), and outputs them to the RFVGA 103.

The first-IF input terminal 102 receives first-intermediate frequency conversion (IF) signals, which are signals after frequency conversion of RF signals that are satellite digital broadcast wave signals supplied from a satellite digital broadcasting antenna (not illustrated), and outputs them to the RFVGA 104.

The RFVGAs 103 and 104 are VGAs capable of varying an amplification degree on the basis of a control voltage that changes according to the magnitude of the signal level of the RF signals. The RFVGA 103 amplifies the RF signals supplied from the RF input terminal 101. The RF signals are supplied to the RF filter of the frequency band corresponding to the frequency of the channel to be selected among the RF filters 105-1 to 105-n.

The RFVGA 104 amplifies the first-IF signals supplied from the first-IF input terminal 102. The first-IF signals are supplied to the RF filter 106.

The RF filters 105-1 to 105-n include a plurality of RF filters corresponding to frequencies of channels of the terrestrial broadcasting. The RF filters 105-1 to 105-n corresponding to frequencies of channels tune the frequency of the RF signals supplied from the RFVGA 103 to the frequency of the channel, thereby performing filtering. The RF signals after the filtering performed by any of the RF filters 105-1 to 105-n are output to the MIX 107.

Note that, hereinafter, the RF filters 105-1 to 105-n will be referred to as an RF filter 105 in a case where it is not particularly necessary to distinguish them.

The RF filter 106 includes an RF filter corresponding to the frequency of the satellite digital broadcasting. The RF filter 106 tunes the frequency of the first-IF signals supplied from the RFVGA 104 to the frequency of the RF filter 106, thereby performing filtering. The first-IF signals filtered by the RF filter 106 are output to the MIX 107.

The MIX 107 is a frequency conversion circuit (mixer) that converts a frequency of a high RF into an IF or a frequency of a low baseband (BB). When the RF signals or the first-IF signals after filtering are supplied to the MIX 107, oscillation signals I1 of I signals (0 degrees) and oscillation signals Q1 of Q signals (90 degrees) whose phases are orthogonal to each other are also supplied to the MIX 107.

The RF signals are subject to frequency conversion into IF signals I1 and IF signals Q1 by the oscillation signals I1 and the oscillation signals Q1 supplied to the MIX 107, and are supplied to the complex-filter/LPF 108. At this time, an image component may be added to the IF signals I1 and the IF signals Q1.

The first-IF signals are subject to frequency conversion into BB signals I1 and BB signals Q1 by the oscillation signals I1 and the oscillation signals Q1 supplied to the MIX 107, and are supplied to the complex-filter/LPF 108.

The complex-filter/LPF 108 is a filter that limits the signal band of the signals having been subject to frequency conversion, and includes a complex filter that limits the frequency band of the IF and an LPF that limits the frequency band of the BB. In the complex-filter/LPF 108, the complex filter is selected in a case where the IF signals are supplied from the MIX 107, and the LPF is selected in a case where the first-IF signals are supplied from the MIX 107.

In a case where the IF signals are supplied from the MIX 107 and the complex filter is selected, the complex-filter/LPF 108 limits the frequency bands of the IF signals I1 and the IF signals Q1, and outputs the IF signals I1 and the IF signals Q1. In a case where the first-IF signals are supplied from the MIX 107 and the LPF is selected, the complex-filter/LPF 108 limits the frequency bands of the BB signals I1 and the BB signals Q1, and outputs the BB signals I1 and the BB signals Q1.

The IF signals I1 supplied from the complex-filter/LPF 108 are output to the IQ combiner 110 via a terminal a of the switch 109. The IF signals Q1 supplied from the complex-filter/LPF 108 are output to the IQ combiner 110 via a terminal a of the switch 111.

The IQ combiner 110 performs IQ combining of the IF signals I1 and the IF signals Q1 to generate IF signals from which image components are removed, and outputs them to the IFVGA 112.

The BB signals I1 supplied from the complex-filter/LPF 108 are output to the BBVGA 113 via a terminal b of the switch 109. The BB signals Q1 supplied from the complex-filter/LPF 108 are output to the BBVGA 114 via a terminal b of the switch 111.

The IFVGA 112, the BBVGA 113, and the BBVGA 114 are VGAs capable of varying an amplification degree on the basis of a control voltage that changes according to the magnitude of the supplied signal level.

The IFVGA 112 amplifies the IF signals supplied from the IQ combiner 110, and outputs the amplified IF signals to the IF signal output terminal 115. The BBVGA 113 amplifies BB(I) signals supplied via the switch 109, and outputs the amplified BB(I) signals to the BB(I) signal output terminal 116. The BBVGA 114 amplifies BB(Q) signals supplied via the switch 111, and outputs the amplified BB(Q) signals to the BB(Q) signal output terminal 117.

The IF signal output terminal 115 outputs the IF signals supplied from the IFVGA 112 to a demodulation processing unit (not illustrated) at a subsequent stage. The BB(I) signal output terminal 116 outputs the BB(I) signals supplied from the BBVGA 113 to a demodulation processing unit (not illustrated) at a subsequent stage. The BB(Q) signal output terminal 117 outputs the BB(Q) signals supplied from the BBVGA 114 to a demodulation processing unit (not illustrated) at a subsequent stage.

<Frequency Ranges of Terrestrial Broadcasting and Satellite Digital Broadcasting>

Figure 2:
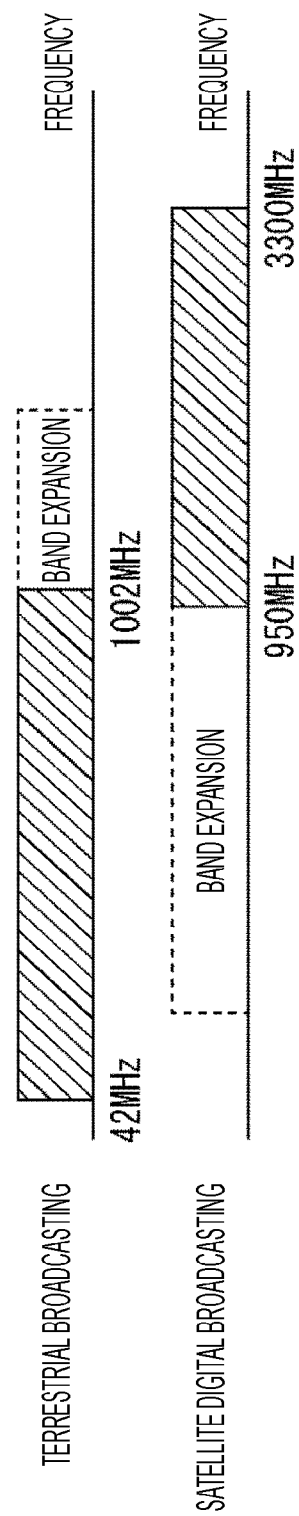
FIG. 2 is a diagram illustrating an image of frequency ranges of terrestrial broadcasting and satellite digital broadcasting.

FIG. 2 is a diagram illustrating an image of frequency ranges of terrestrial broadcasting and satellite digital broadcasting.

The RF frequency of the currently actually operated terrestrial broadcasting is approximately 42 MHz to 1002 MHz as illustrated in the hatched portion in the upper part. Furthermore, the first-IF frequency of the satellite digital broadcasting is approximately 950 MHz to 3300 MHz as illustrated in the hatched portion in the lower part.

Internet services have been expanded, such as being used for CATV Internet services (DOCSIS, etc.) in a case of cable digital broadcasting, and being used as support for a wideband LNB in a case of satellite digital broadcasting. In the future, with the expansion of such Internet services, services are going to be used with the frequency range expanded from the current frequency range as illustrated in the respective rectangular portions of broken lines in FIG. 2.

In a case of receiving a frequency of digital broadcasting having a frequency band wider than the current frequency band, a broadcast receiving apparatus capable of receiving a wider frequency is newly required instead of the conventional broadcast receiving apparatus.

<Exemplary Configuration of Tuner to which RF Filter is Added>

Figure 3:
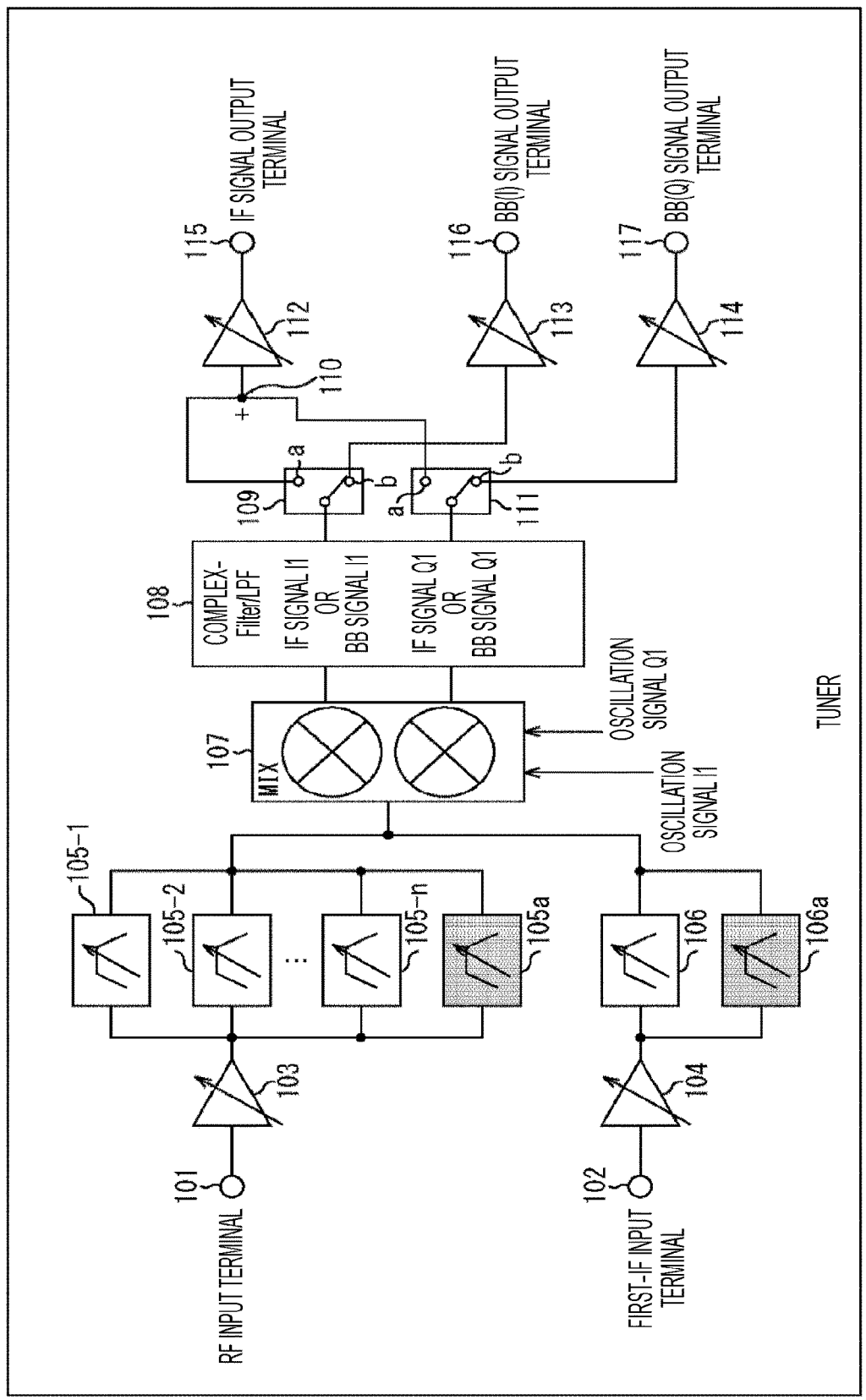
FIG. 3 is a diagram illustrating an exemplary configuration of a tuner to which an RF filter is added.

FIG. 3 is a block diagram illustrating an exemplary configuration of a tuner to which an RF filter is added.

The tuner of FIG. 3 is different from the tuner of FIG. 1 in that an RF filter 105a and an RF filter 106a are added. In the configurations illustrated in FIG. 3, configurations same as the configurations described with reference to FIG. 1 are denoted by the same reference signs. Duplicate descriptions will be omitted as appropriate.

The RF filter 105a is a filter that filters signals having a frequency expanded to a frequency higher than the current frequency in the terrestrial broadcasting. The RF filter 106a is a filter that filters signals having a frequency expanded to a frequency lower than the current frequency in the satellite digital broadcasting.

The circuit scale of the tuner of FIG. 3 becomes larger than that of the tuner of FIG. 1 as the RF filter 105a and the RF filter 106a have been added.

In view of the above, in the present technology, there is provided a switch that causes RF signals to be input to the RF filter 105, which is a first filter, or to the RF filter 106, which is a second filter, by switching according to the frequency of the RF signals, and causes first-IF signals to be input to the first filter or to the second filter by switching according to the frequency of the first-IF signals.

With this arrangement, it becomes possible to receive signals of a range of frequencies wider than the current range without making a significant change to the current receiving apparatus. Furthermore, it becomes possible to suppress increases in size and cost due to circuit complexity.

2. Broadcast Receiving System

<Exemplary Configuration of Broadcast Receiving System>

Figure 4:
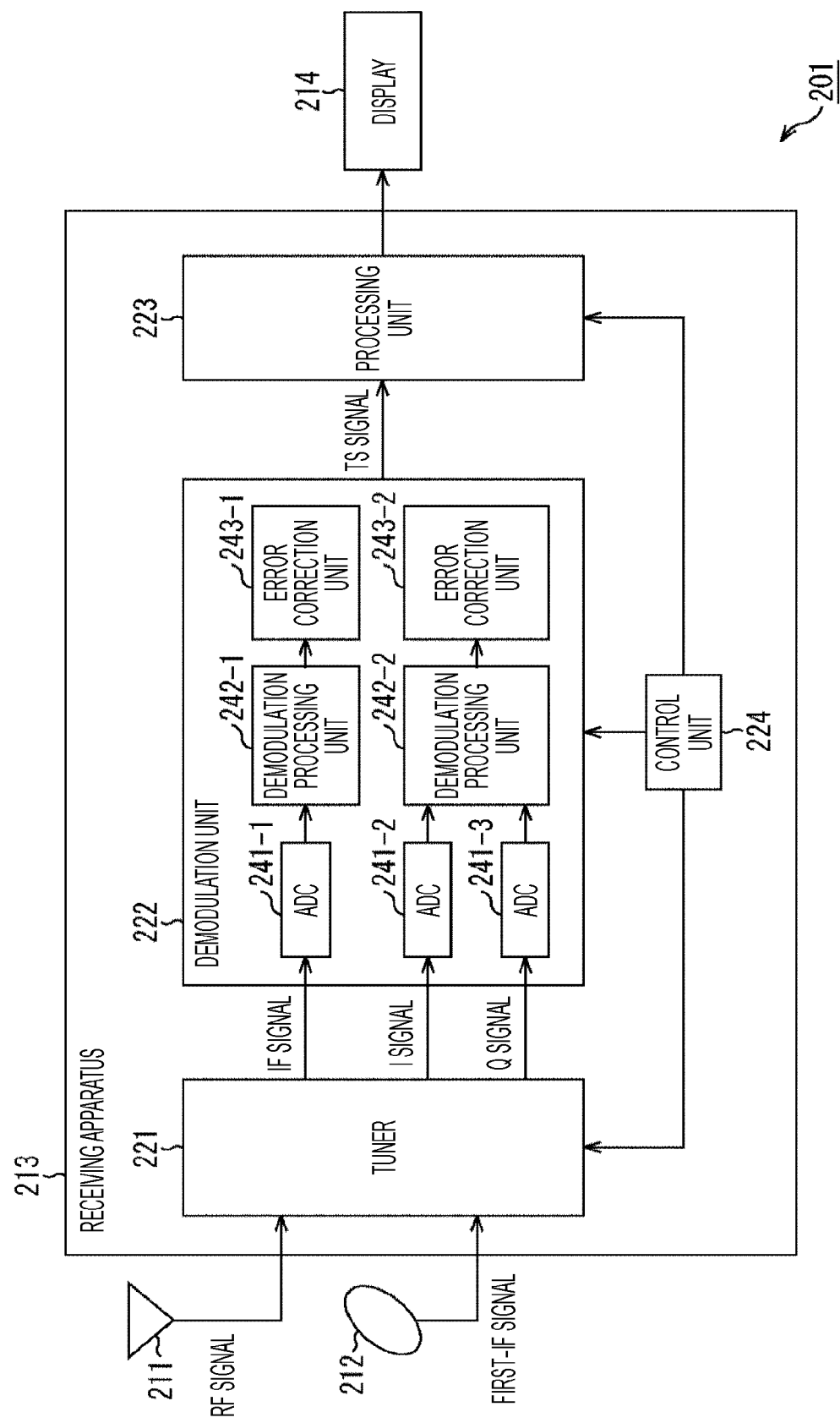
FIG. 4 is a block diagram illustrating an exemplary configuration of a broadcast receiving system according to an embodiment of the present technology.

FIG. 4 is a block diagram illustrating an exemplary configuration of a broadcast receiving system according to an embodiment of the present technology.

A broadcast receiving system 201 of FIG. 4 includes a terrestrial broadcasting antenna 211, a satellite digital broadcasting antenna 212, a receiving apparatus 213, and a display 214.

The terrestrial broadcasting antenna 211 receives terrestrial digital broadcast waves transmitted from a transmission apparatus of a broadcast station (not illustrated), and outputs radio frequency (RF) signals to the receiving apparatus 213. The broadcast waves of the terrestrial broadcasting are modulated by the transmission apparatus and then transmitted. Cable digital broadcast waves are transmitted by a cable, and are connected to the receiving apparatus 213 instead of the terrestrial broadcasting antenna 211. Note that, hereinafter, the terrestrial digital broadcast waves and the cable digital broadcast waves are collectively referred to as broadcast waves of the terrestrial broadcasting.

The satellite digital broadcasting antenna 212 receives satellite digital broadcast waves transmitted from a transmission apparatus of a satellite (not illustrated). The satellite digital broadcasting antenna 212 includes a frequency converter (not illustrated). The satellite digital broadcasting antenna 212 performs frequency conversion on the RF signals using the frequency converter, and outputs first-IF signals, which are signals after the frequency conversion, to the receiving apparatus 213.

The receiving apparatus 213 includes a tuner 221, a demodulation unit 222, a processing unit 223, and a control unit 224.

The tuner 221 includes one chip (semiconductor chip), such as LSI. The tuner 221 selects a frequency of a channel desired by a user according to control signals supplied from the control unit 224. The tuner 221 amplifies the RF signals of the selected frequency, and performs frequency conversion to convert the frequency of the RF signals into a lower frequency.

At this time, the RF signals of the terrestrial broadcasting are converted into IF signals, which are signals of an IF frequency of approximately 4 MHz, using a wave detection method called a "superheterodyne system".

The first-IF signals of the satellite digital broadcasting are converted into baseband (BB) signals of 0 MHz to several 10 MHz using a wave detection method called a "direct conversion system". The BB signals include I signals (0 degrees) and Q signals (90 degrees) whose phases are orthogonal to each other.

The demodulation unit 222 performs demodulation processing according to the control signals supplied from the control unit 224. The demodulation unit 222 includes analog-digital converters (ADCs) 241-1 to 241-3, demodulation processing units 242-1 to 242-2, and error correction units 243-1 and 243-2.

The respective ADCs 241-1 to 241-3 convert the IF signals, I signals, and Q signals, which are analog signals supplied from the tuner 221, into digital signals. The ADC 241-1 outputs the converted digital signals to the demodulation processing unit 242-1. The ADCs 241-2 and 241-3 output the converted digital signals to the demodulation processing unit 242-2.

The demodulation processing units 242-1 and 242-2 perform demodulation processing on the converted digital signals, and output the demodulated signals to the error correction units 243-1 and 243-2, respectively.

The error correction units 243-1 and 243-2 perform error correction on the demodulated signals, and output, to the processing unit 223, transport stream (TS) signals obtained as a result thereof, for example.

The processing unit 223 performs demux processing, demultiplexing processing, and decoding processing on TS signal data supplied from the error correction units 243-1 and 243-2 according to the control signals supplied from the control unit 224.

The demux processing is, for example, processing of separating a video part, an audio part, a subtitle part, and the like of a video content. The demultiplexing processing is, for example, processing of demultiplexing video data and audio data included in data. The decoding processing is processing of generating video signals by decoding video data, and the generated video signals are output to the display 214. Furthermore, the decoding processing is processing of generating audio signals by decoding audio data, and the generated audio signals are output to a speaker (not illustrated).

The control unit 224 includes a central processing unit (CPU), a read only memory (ROM), a random access memory (RAM), and the like. The control unit 224 executes a program stored in the ROM or the like, and controls the tuner 221, the demodulation unit 222, and the processing unit 223 according to user instruction signals from an operation input unit (not illustrated).

The display 214 displays video representing the video signals supplied from the processing unit 223.

3. Details of Tuner

<Exemplary Configuration of Tuner>

Figure 5:
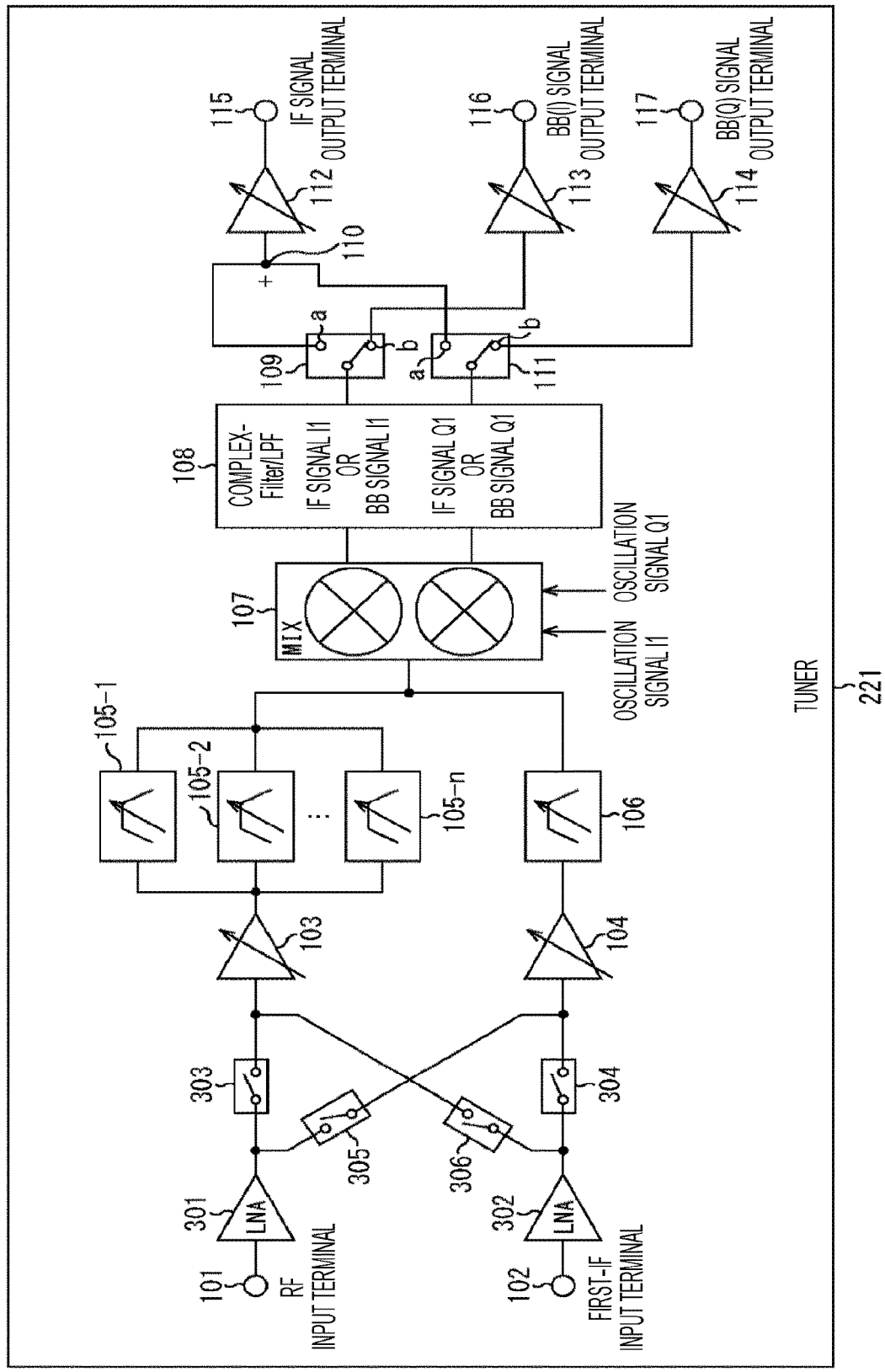
FIG. 5 is a diagram illustrating an exemplary configuration of a tuner.

FIG. 5 is a block diagram illustrating an exemplary configuration of the tuner 221.

The tuner 221 of FIG. 5 is different from the tuner of FIG. 1 in that LNAs 301 and 302 and switches 303 to 306 are newly added. In the configurations illustrated in FIG. 5, configurations same as the configurations described with reference to FIG. 1 are denoted by the same reference signs. Duplicate descriptions will be omitted as appropriate.

The low noise amplifiers (LNAs) 301 and 302 are low noise amplifiers for reducing the influence of the signal loss of the switches 303 to 306 at a subsequent stage.

The LNA 301 amplifies the RF signals supplied from the RF input terminal 101, and outputs the amplified RF signals to the RFVGA 103 via the switch 303, or outputs them to the RFVGA 104 via the switch 305.

The LNA 302 amplifies the first-IF signals supplied from the first-IF input terminal 102, and outputs the amplified first-IF signals to the RFVGA 103 via the switch 306, or outputs them to the RFVGA 104 via the switch 304.

While the switches 303 to 306 are normally in an off state, they enter an on state according to the control signals supplied from the control unit 224 (FIG. 4).

In the control unit 224, for example, a predetermined frequency representing a boundary between the frequency band of the current terrestrial broadcasting (approximately 42 MHz to 1002 MHz) before being expanded and the frequency band of the current satellite digital broadcasting (approximately 950 MHz to 3300 MHz) before being expanded is set in advance. It is sufficient if the predetermined frequency is any frequency in an overlapping portion (950 MHz to 1002 MHz) of the frequency bands of the terrestrial broadcasting and the satellite digital broadcasting. The predetermined frequency may be different between the case of the RF signals and the case of the first-IF signals, such as 1002 MHz in a case where received signals are RF signals, for example, and 950 MHz in a case where received signals are first-IF signals, for example.

In a case where the frequency of the RF signal is a frequency lower than the predetermined frequency, the control unit 224 turns on the switch 303, and causes the RFVGA 103 to output RF signals. In a case where the frequency of the RF signal is a frequency higher than the predetermined frequency, the control unit 224 turns on the switch 305, and causes the RFVGA 104 to output RF signals.

In a case where the frequency of the first-IF signal is a frequency lower than the predetermined frequency, the control unit 224 turns on the switch 306, and causes the RFVGA 103 to output first-IF signals. In a case where the frequency of the first-IF signal is a frequency higher than the predetermined frequency, the control unit 224 turns on the switch 304, and causes the RFVGA 104 to output first-IF signals.

The RFVGA 103 amplifies the RF signals supplied via the switch 303, or the first-IF signals supplied via the switch 306. The RF signals or the first-IF signals are supplied to the RF filter of the frequency band corresponding to the frequency of the channel to be selected among the RF filters 105-1 to 105-n.

The RFVGA 104 amplifies the first-IF signals supplied via the switch 304, or the RF signals supplied via the switch 305. After being amplified, the first-IF signals or the RF signals are supplied to the RF filter 106.

The RF filters 105-1 to 105-n tune the frequency of the RF signals or the first-IF signals supplied from the RFVGA 103 to the frequency of the channel, thereby performing filtering. The RF signals or the first-IF signals after the filtering performed by any of the RF filters 105-1 to 105-n are output to the MIX 107.

The RF filter 106 tunes the frequency of the RF signals or the first-IF signals supplied from the RFVGA 104 to the frequency of the RF filter 106, thereby performing filtering. The first-IF signals or RF signals filtered by the RF filter 106 are output to the MIX 107.

Processing in each unit subsequent to the MIX 107 is processing similar to the processing in each unit subsequent to the MIX 107 described above with reference to FIG. 1.

With the above configuration, the RF filter can be shared by the terrestrial broadcasting and the satellite digital broadcasting, whereby an increase in a circuit scale can be suppressed.

Furthermore, in the case of receiving the RF signals of the terrestrial broadcasting, leakage of the oscillation signals I1 and Q1 of the MIX 107 to the first-IF input terminal 102 is reduced due to the interposition of the switches 304 and 306, thereby reducing unnecessary radiation from the first-IF input terminal 102.

Meanwhile, in the case of receiving the first-IF signals of the satellite digital broadcasting, leakage of the oscillation signals I1 and Q1 of the MIX 107 to the RF input terminal 101 is reduced due to the interposition of the switches 303 and 305, thereby reducing unnecessary radiation from the RF input terminal 101.

<Operation of Tuner>

Figure 6:
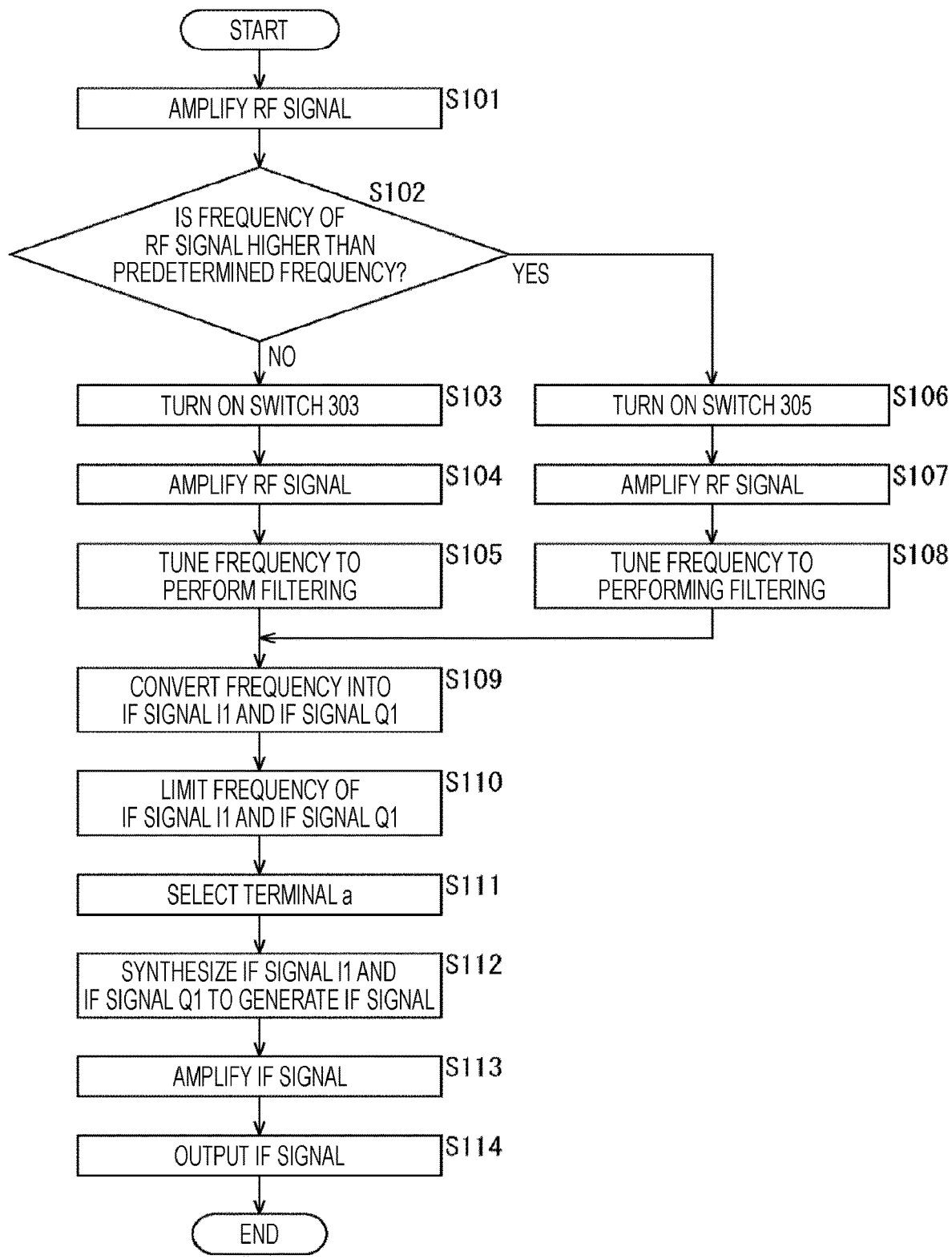
FIG. 6 is a flowchart illustrating a reception process of the tuner in a case where RF signals have been received.

FIG. 6 is a flowchart illustrating a reception process of the tuner in a case where RF signals have been received.

The RF input terminal 101 receives RF signals, which are terrestrial broadcast signals supplied from the terrestrial broadcasting antenna 211, and outputs them to the LNA 301.

In step S101, the LNA 301 amplifies the RF signals supplied from the RF input terminal 101.

In step S102, the control unit 224 determines whether or not the frequency of the RF signal is a frequency higher than a predetermined frequency. In a case where the frequency of the RF signal is determined to be a frequency lower than the predetermined frequency in step S102, the process proceeds to step S103.

In step S103, the control unit 224 turns on the switch 303, and turns off the switch 305. The RF signals amplified by the LNA 302 are supplied to the RFVGA 103 via the switch 303.

In step S104, the RFVGA 103 amplifies the RF signals supplied via the switch 303. The RF signals are supplied to the RF filter of the frequency band corresponding to the frequency of the channel to be selected among the RF filters 105-1 to 105-n.

In step S105, the RF filter 105 corresponding to the frequency of the channel tunes the frequency of the RF signals supplied from the RFVGA 103 to the frequency of the channel, thereby performing filtering. The RF signals filtered by the RF filter 105 are output to the MIX 107.

On the other hand, in a case where the frequency of the RF signal is determined to be a frequency higher than the predetermined frequency in step S102, the process proceeds to step S106.

In step S106, the control unit 224 turns on the switch 305, and turns off the switch 303. The RF signals amplified by the LNA 301 are supplied to the RFVGA 104 via the switch 305.

In step S107, the RFVGA 104 amplifies the RF signals supplied via the switch 305. The RF signals are supplied to the RF filter 106.

In step S108, the RF filter 106 tunes the frequency of the RF signals supplied from the RFVGA 104 to the frequency of the RF filter 106, thereby performing filtering. The RF signals filtered by the RF filter 106 are output to the MIX 107.

Subsequent to step S105 or S108, the process proceeds to step S109.

In step S109, the MIX 107 performs frequency conversion to convert the high frequency of the RF signals into the IF signals I1 and the IF signals Q1. The IF signals I1 and the IF signals Q1 having been subject to the frequency conversion by the MIX 107 are supplied to the complex-filter/LPF 108.

In the complex-filter/LPF 108, the complex filter is selected in a case where the IF signals are supplied from the MIX 107, and the LPF is selected in a case where the BB signals are supplied from the MIX 107.

In step S110, in a case where the complex filter is selected, the complex-filter/LPF 108 limits the frequency bands of the IF signals I1 and the IF signals Q1, and outputs the IF signals I1 and the IF signals Q1.

In step S111, the switch 109 and the switch 111 select the terminal a according to the control signals of the control unit 224. The IF signals I1 supplied from the complex-filter/LPF 108 are output to the IQ combiner 110 via a terminal a of the switch 109. The IF signals Q1 supplied from the complex-filter/LPF 108 are output to the IQ combiner 110 via a terminal a of the switch 111.

In step S112, the IQ combiner 110 performs IQ combining of the IF signals I1 and the IF signals Q1 to generate IF signals from which image components are removed, and outputs them to the IFVGA 112.

In step S113, the IFVGA 112 amplifies the IF signals supplied from the IQ combiner 110.

In step S114, the IFVGA 112 outputs the amplified IF signals to the IF signal output terminal 115.

Figure 7:
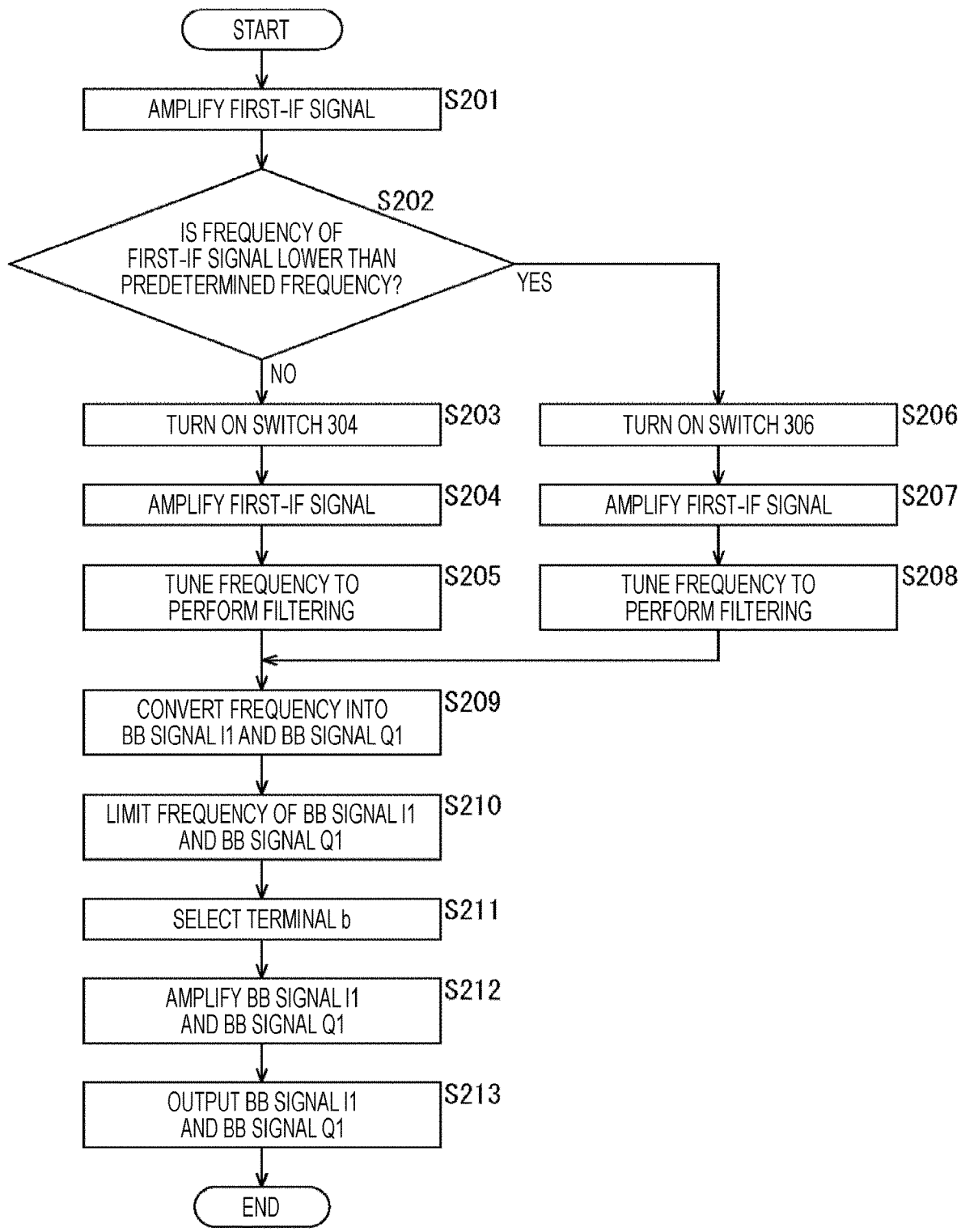
FIG. 7 is a flowchart illustrating a reception process of the tuner in a case where first-IF signals have been received.

FIG. 7 is a flowchart illustrating a reception process of the tuner in a case where first-IF signals have been received.

The first-IF input terminal 102 receives first-IF signals, which are satellite digital broadcast signals supplied from the satellite digital broadcasting antenna 212, and outputs them to the LNA 302.

In step S201, the LNA 302 amplifies the first-IF signals supplied from the first-IF input terminal 102.

In step S202, the control unit 224 determines whether or not the frequency of the first-IF signal is lower than a predetermined frequency. In a case where the frequency of the first-IF signal is determined to be higher than the predetermined frequency in step S202, the process proceeds to step S203.

In step S203, the control unit 224 turns on the switch 304, and turns off the switch 306. The RF signals amplified by the LNA 302 are supplied to the RFVGA 104 via the switch 304.

In step S204, the RFVGA 104 amplifies the first-IF signals supplied via the switch 304. The first-IF signals are supplied to the RF filter 106.

In step S205, the RF filter 106 tunes the frequency of the RF signals supplied from the RFVGA 104 to the frequency of the RF filter 106, thereby performing filtering. The RF signals filtered by the RF filter 106 are output to the MIX 107.

On the other hand, in a case where the frequency of the first-IF signal is determined to be lower than the predetermined frequency in step S202, the process proceeds to step S206.

In step S206, the control unit 224 turns on the switch 306, and turns off the switch 304. The first-IF signals amplified by the LNA 302 are supplied to the RFVGA 103 via the switch 306.

In step S207, the RFVGA 103 amplifies the first-IF signals supplied via the switch 306. The first-IF signals are supplied to the RF filter of the frequency band corresponding to the frequency of the channel to be selected among the RF filters 105-1 to 105-n.

In step S208, the RF filters 105-1 to 105-n corresponding to the frequency of the channel tune the frequency of the first-IF signals supplied from the RFVGA 103 to the frequency of the channel, thereby performing filtering. The first-IF signals filtered by the RF filter 105 are output to the MIX 107.

Subsequent to step S205 or S208, the process proceeds to step S209.

In step S209, the MIX 107 performs frequency conversion to convert the high frequency of the first-IF signals into the BB signals I1 and the BB signals Q1. The BB signals I1 and the BB signals Q1 having been subject to the frequency conversion by the MIX 107 are supplied to the complex-filter/LPF 108.

In the complex-filter/LPF 108, the complex filter is selected in a case where the IF signals are supplied from the MIX 107, and the LPF is selected in a case where the BB signals are supplied from the MIX 107.

In step S210, in a case where the LPF is selected, the complex-filter/LPF 108 limits the frequency bands of the BB signals I1 and the BB signals Q1, and outputs the BB signals I1 and the BB signals Q1.

In step S211, the switch 109 and the switch 111 select the terminal b according to the control signals of the control unit 224. The BB signals I1 supplied from the complex-filter/LPF 108 are output to the BBVGA 113 via a terminal b of the switch 109. The BB signals Q1 supplied from the complex-filter/LPF 108 are output to the BBVGA 114 via a terminal b of the switch 111.

In step S212, the BBVGA 113 amplifies the BB signals I1 supplied via the terminal b of the switch 109. The BBVGA 114 amplifies the BB signals Q1 supplied via the terminal b of the switch 111.

In step S213, the BBVGA 113 outputs the amplified BB signals I1 to the BB(I) signal output terminal 116. The BBVGA 114 outputs the amplified BB signals Q1 to the BB(Q) signal output terminal 117.

4. Variations

<Another Exemplary Configuration of Tuner>

Figure 8:
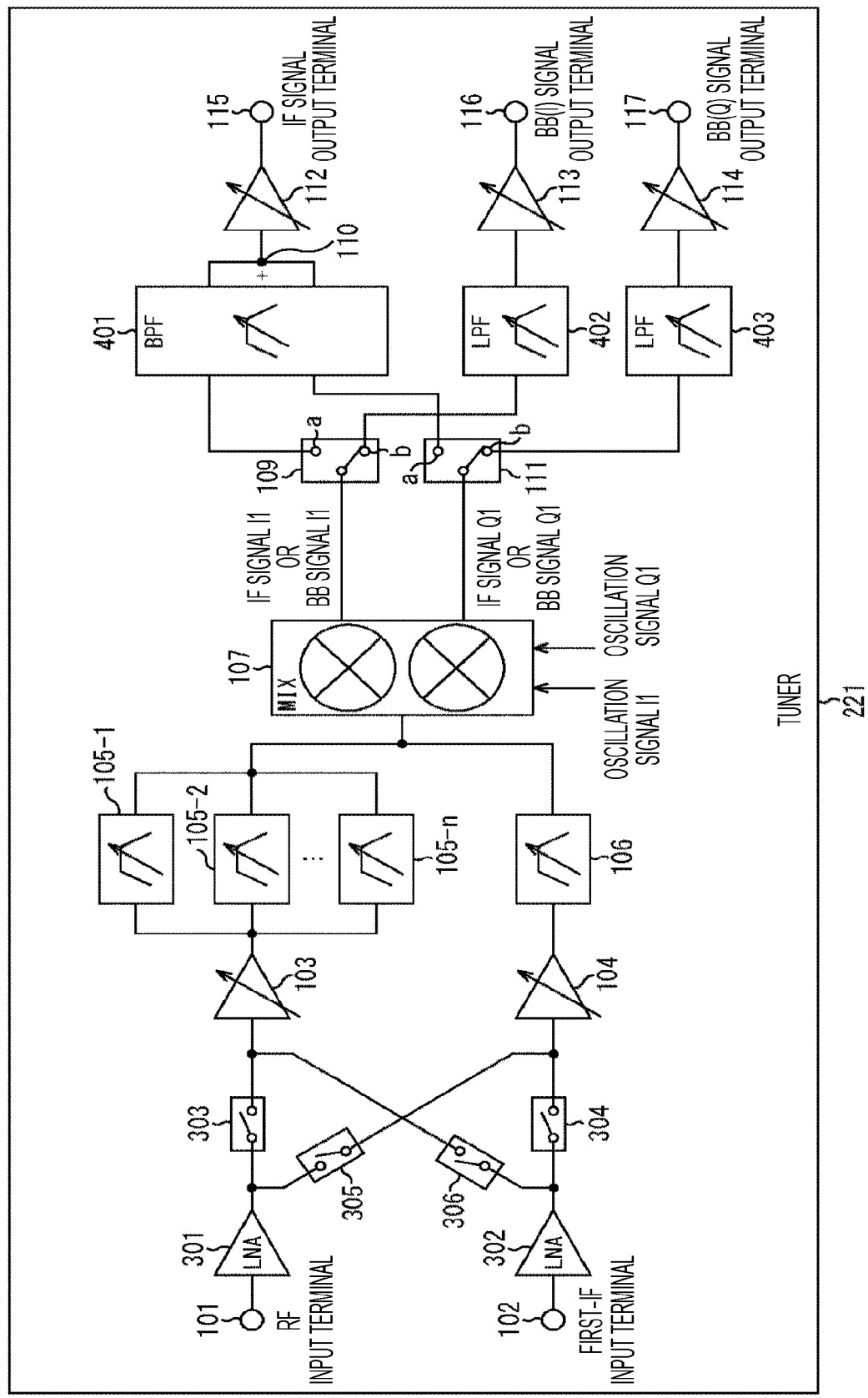
FIG. 8 is a diagram illustrating another exemplary configuration of the tuner of FIG. 5.

FIG. 8 is a block diagram illustrating another exemplary configuration of the tuner 221 of FIG. 5.

A tuner 221 of FIG. 8 is different from the tuner 221 of FIG. 5 in that a complex band-pass filter (BPF) 401, an LPF 402, and an LPF 403 are provided instead of the complex-filter/LPF 108, and the positions of the switches 109 and 111 and the positions of the complex BPF 401, the LPF 402, and the LPF 403 are switched. In the configurations illustrated in FIG. 8, configurations same as the configurations described with reference to FIG. 5 are denoted by the same reference signs. Duplicate descriptions will be omitted as appropriate.

A MIX 107 performs frequency conversion to convert RF signals into IF signals I1 and IF signals Q1, and outputs them to the switches 109 and 111, respectively. The MIX 107 performs frequency conversion to convert first-IF signals into BB signals I1 and BB signals Q1, and outputs them to the switches 109 and 111, respectively.

The IF signals I1 supplied from the MIX 107 are output to the complex BPF 401 via a terminal a of the switch 109. The IF signals Q1 supplied from the MIX 107 are output to the complex BPF 401 via a terminal a of the switch 111.

The complex BPF 401 is a filter that limits the signal band of the IF signals. The complex BPF 401 limits the signal bands of the IF signals I1 and the IF signals Q1, and outputs them to an IQ combiner 110. The IQ combiner 110 performs IQ combining of the IF signals I1 and the IF signals Q1 to generate IF signals after the IQ combining, and outputs them to an IFVGA 112.

The BB signals I1 supplied from the MIX 107 are output to the LPF 402 via a terminal b of the switch 109. The BB signals Q1 supplied from the MIX 107 are output to the LPF 403 via a terminal b of the switch 111.

The LPFs 402 and 403 are low pass filters that limit the signal band of the BB signals. The LPF 402 limits the signal band of the BB signals I1, and outputs them to a BB(I) signal output terminal 116. The LPF 403 limits the signal band of the BB signals Q1, and outputs them to a BB(Q) signal output terminal 117.

With the above configuration, also in the case of the tuner 221 of FIG. 8, an RF filter can be shared by terrestrial broadcasting and satellite digital broadcasting, whereby an increase in a circuit scale can be suppressed.

Furthermore, in the case of receiving the RF signals of the terrestrial broadcasting, leakage of the oscillation signals I1 and Q1 of the MIX 107 to the first-IF input terminal 102 is reduced due to the interposition of the switches 304 and 306, thereby reducing unnecessary radiation from the first-IF input terminal 102.

Meanwhile, in the case of receiving the first-IF signals of the satellite digital broadcasting, leakage of the oscillation signals I1 and Q1 of the MIX 107 to the RF input terminal 101 is reduced due to the interposition of the switches 303 and 305, thereby reducing unnecessary radiation from the RF input terminal 101.

Note that, in the tuner 221 of FIG. 8, the complex-filter/LPF 108 is replaced with the complex BPF 401, the LPF 402, and the LPF 403, whereby the circuit scale becomes larger than that of the tuner 221 of FIG. 5.

Figure 9:
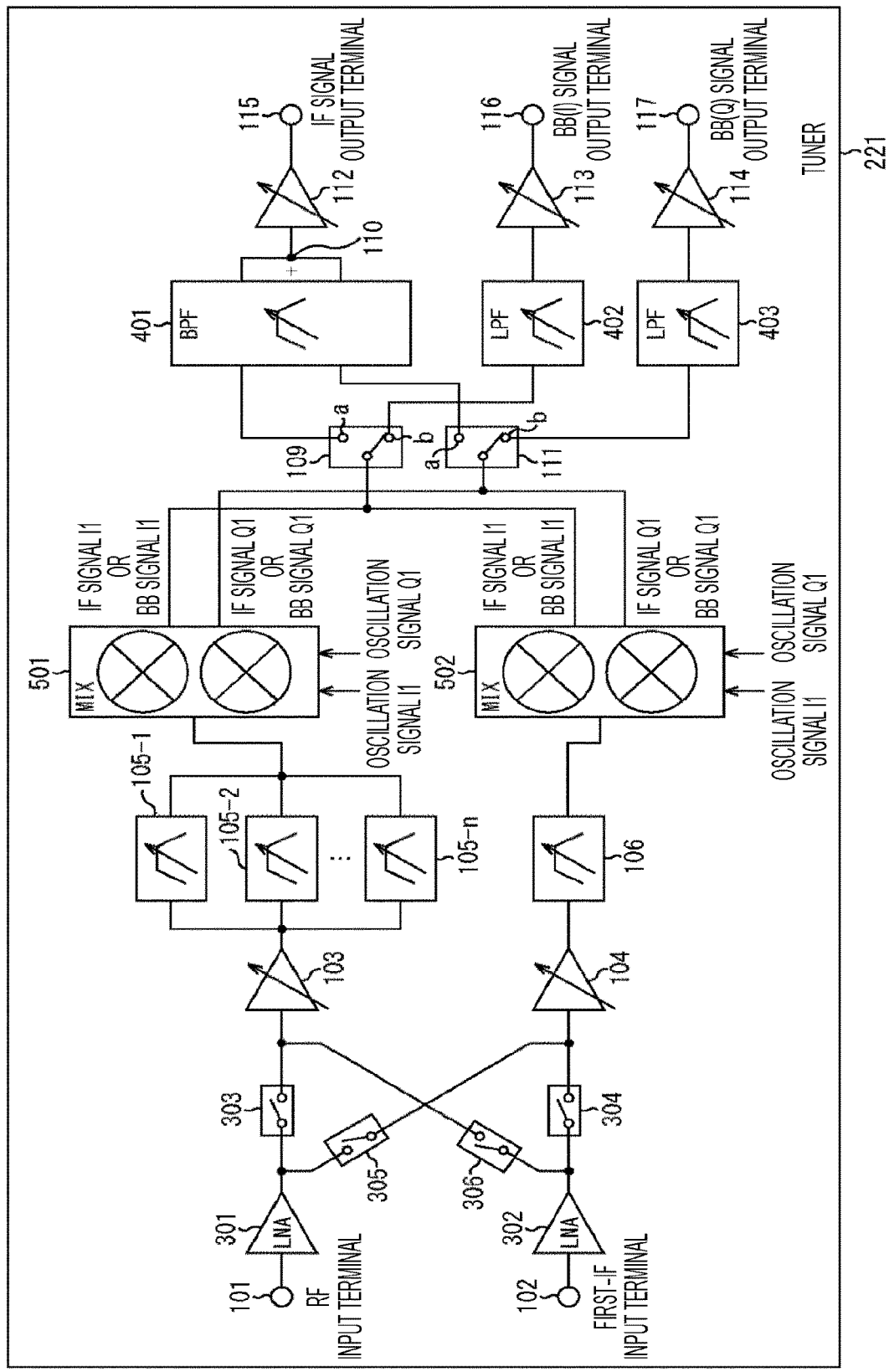
FIG. 9 is a diagram illustrating another exemplary configuration of the tuner of FIG. 8.

FIG. 9 is a block diagram illustrating another exemplary configuration of the tuner 221 of FIG. 8.

The tuner 221 of FIG. 9 is different from the tuner 221 of FIG. 8 in that MIXs 501 and 502 are provided instead of the MIX 107. In the configurations illustrated in FIG. 9, configurations same as the configurations described with reference to FIG. 8 are denoted by the same reference signs. Duplicate descriptions will be omitted as appropriate.

The RF signals or first-IF signals filtered by an RF filter 105 are output to the MIX 501. The RF signals or first-IF signals filtered by an RF filter 106 are output to the MIX 502.

The MIXs 501 and 502 perform frequency conversion to convert the RF signals into IF signals I1 and IF signals Q1, and outputs them to the switches 109 and 111, respectively. The MIXs 501 and 502 perform frequency conversion to convert the first-IF signals into BB signals I1 and BB signals Q1, and outputs them to the switches 109 and 111, respectively.

The IF signals I1 supplied from the MIX 501 or 502 are output to the complex BPF 401 via the terminal a of the switch 109. The IF signals Q1 supplied from the MIX 501 or 502 are output to the complex BPF 401 via the terminal a of the switch 111.

The BB signals I1 supplied from the MIX 501 or 502 are output to the LPF 402 via the terminal b of the switch 109. The BB signals Q1 supplied from the MIX 501 or 502 are output to the LPF 403 via the terminal b of the switch 111.

Processing in each unit subsequent to the complex BPF 401, the LPF 402, and the LPF 403 is processing similar to the processing in each unit subsequent to the complex BPF 401, the LPF 402, and the LPF 403 described above with reference to FIG. 8.

With the above configuration, also in the case of the tuner 221 of FIG. 9, the RF filter can be shared by terrestrial broadcasting and satellite digital broadcasting, whereby an increase in a circuit scale can be suppressed.

Furthermore, in the case of receiving the RF signals of the terrestrial broadcasting, leakage of the oscillation signals I1 and Q1 of the MIX 107 to the first-IF input terminal 102 is reduced due to the interposition of the switches 304 and 306, thereby reducing unnecessary radiation from the first-IF input terminal 102.

Meanwhile, in the case of receiving the first-IF signals of the satellite digital broadcasting, leakage of the oscillation signals I1 and Q1 of the MIX 107 to the RF input terminal 101 is reduced due to the interposition of the switches 303 and 305, thereby reducing unnecessary radiation from the RF input terminal 101.

Note that, in the tuner 221 of FIG. 9, the MIX 107 is replaced with the MIXs 501 and 502, whereby the circuit scale becomes larger than that of the tuner 221 of FIG. 8.

5. Others

<Effect>

As expansion of a frequency range used by an added service, in general, the terrestrial side spreads to a higher frequency, and the satellite side spreads to a lower frequency. Therefore, the frequency ranges of the terrestrial broadcasting and the satellite digital broadcasting overlap with each other.

The present technology has a circuit configuration in which use efficiency of the circuit is increased with respect to the overlapping frequency, and has a configuration in which the filter circuit on the terrestrial side and the filter circuit on the satellite side are switched according to the frequency so that the respective filter circuits can be used.

With this arrangement, it becomes possible to suppress increases in size and cost due to circuit complexity.

In particular, since the RF filter is a circuit including an LC resonance circuit of an inductor and a capacitor, it is necessary to increase a physical size of the inductor when an RF filter of a low frequency is additionally mounted, which exerts a significant impact on increases in chip size and cost.

In view of the above, a switch is provided between the LNA and the RFVGA, whereby the magnitude of unnecessary radiation output from an unused input terminal can be suppressed. With this arrangement, the tuner 221 is not necessarily required to include either or both of the LNA 301 and the LNA 302, whereby the circuit scale can be reduced.

<Exemplary Application>

Figure 10:
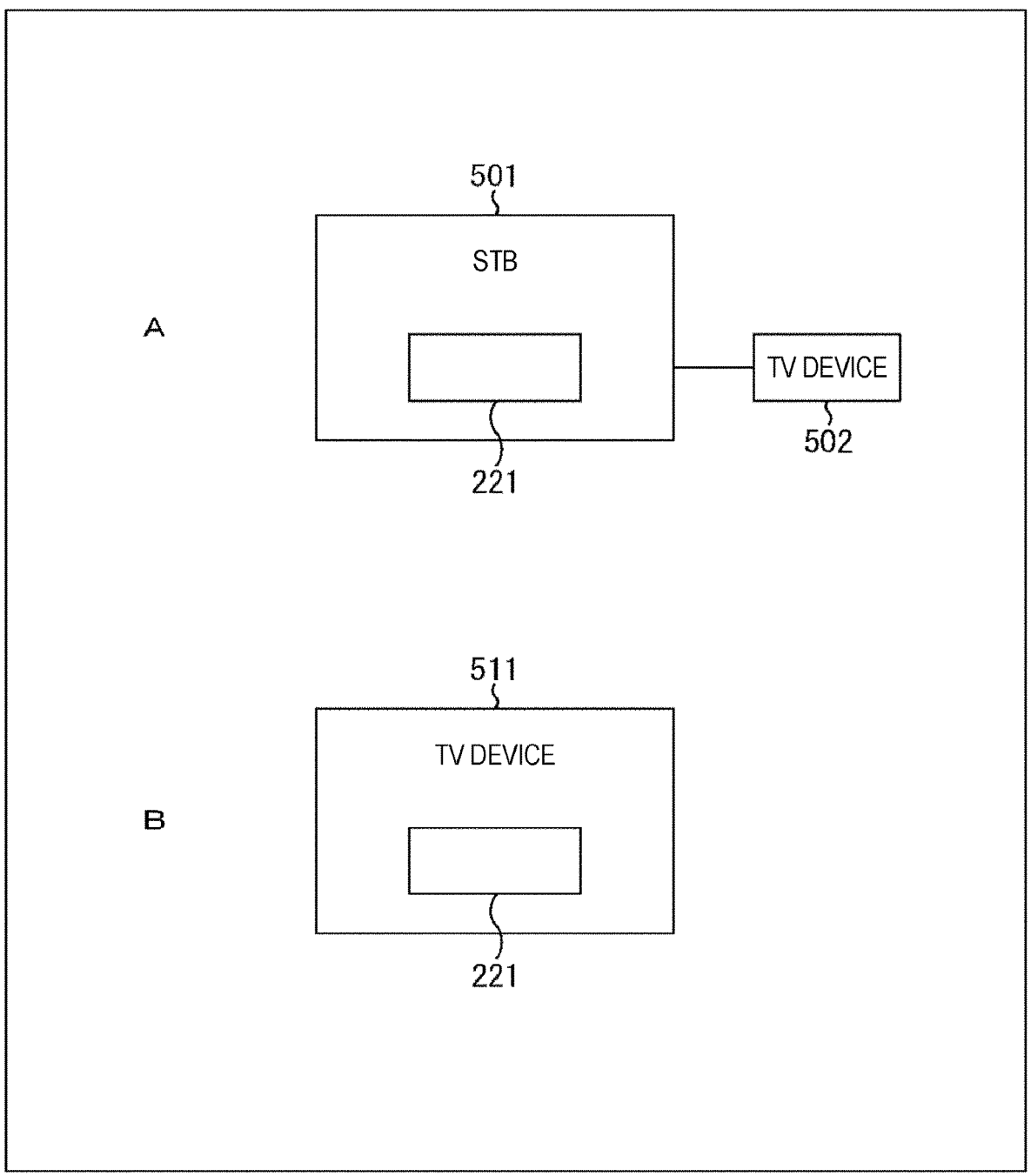
FIG. 10 is a diagram illustrating exemplary configurations of an STB and a TV device to which the present technology is applied.

FIG. 10 is a diagram illustrating exemplary configurations of a set top box (STB) and a television (TV) device to which the present technology is applied.

In A of FIG. 10, a broadcast receiving system including an STB 501 including the tuner 221 of FIG. 4 and a TV device 502 is illustrated.

In B of FIG. 10, a TV device 511 including the tuner 221 of FIG. 4 is illustrated.

Note that, although not illustrated in FIG. 10, a terrestrial broadcasting antenna 211 and a satellite digital broadcasting antenna 212 are also built in the STB 501 and the TV device 511.

As described above, the present technology is also applicable to an STB, a TV device, and the like.

Note that, in the present specification, a system indicates a set of a plurality of constituent elements (devices, modules (parts), etc.), and it does not matter whether or not all the constituent elements are in the same housing. Therefore, a plurality of devices housed in separate housings and connected through a network, and one device in which a plurality of modules is housed in one housing are both systems.

Furthermore, the effects described herein are merely examples and not limited, and additional effects may be included.

An embodiment of the present technology is not limited to the embodiment described above, and various modifications can be made without departing from the gist of the present technology.

Furthermore, each step described in the flowcharts described above may be executed by one device or shared by a plurality of devices.

Moreover, in a case where a plurality of processes is included in one step, the plurality of processes included in the one step may be executed by one device or shared by a plurality of devices.

The present technology may also employ the following configurations.

(1)

A semiconductor chip including:
an RF input terminal to which an RF signal of terrestrial broadcasting is input;
a first-IF input terminal to which a first-IF signal of satellite digital broadcasting is input;
a first filter that filters a signal in a frequency band lower than a predetermined frequency;
a second filter that filters a signal in a frequency band equal to or higher than the predetermined frequency; and
a switch that causes the RF signal to be input to the first filter or to the second filter by switching according to a frequency of the RF signal, and causes the first-IF signal to be input to the first filter or to the second filter by switching according to a frequency of the first-IF signal.

(2)

The semiconductor chip according to (1) described above, further including:
at least one LNA circuit that amplifies the RF signal or the first-IF signal, the at least one LNA circuit being provided at a preceding stage of the switch.

(3)

The semiconductor chip according (1) or (2) described above, further including:
an RFVGA circuit that changes gains of the RF signal and the first-IF signal according to a signal level, the RFVGA circuit being provided at a preceding stage of the first filter and the second filter.

(4)

The semiconductor chip according to any one of (1) to (3) described above, further including:
a frequency conversion circuit that performs frequency conversion on the RF signal to generate an IF signal having a frequency lower than the frequency of the RF signal, and performs frequency conversion on the first-IF signal to generate a baseband BB signal; and
at least one output terminal that outputs the IF signal or the BB signal.

(5)

The semiconductor chip according to (4) described above, in which
the frequency conversion circuit outputs, as the IF signal, an IF(I) signal and an IF(Q) signal whose phases are orthogonal to each other, and outputs, as the BB signal, a BB(I) signal and a BB(Q) signal whose phases are orthogonal to each other, and
the output terminal includes a first output terminal that outputs a signal obtained by synthesizing the IF(I) signal and the IF(Q) signal as the IF signal, a second output terminal that outputs the BB(I) signal as one of the BB signals, and a third output terminal that outputs the BB(Q) signal as the other of the BB signals.

(6)

The semiconductor chip according to (4) described above, further including:
a filter circuit that limits signal bands of the IF signal and the BB signal; and
a VGA circuit that is disposed at a preceding stage of the output terminal and changes gains of the IF signal and the BB signal according to a signal level after the frequency conversion.

(7)

A receiving apparatus including a tuner including:
an RF input terminal to which an RF signal of terrestrial broadcasting is input;
a first-IF input terminal to which a first-IF signal of satellite digital broadcasting is input;
a first filter that filters a signal in a frequency band lower than a predetermined frequency;
a second filter that filters a signal in a frequency band equal to or higher than the predetermined frequency; and a switch that causes the RF signal to be input to the first filter or to the second filter by switching according to a frequency of the RF signal, and causes the first-IF signal to be input to the first filter or to the second filter by switching according to a frequency of the first-IF signal.

(8)

The receiving apparatus according to (7) described above, in which the tuner further includes, at a preceding stage of the switch, at least one LNA circuit that amplifies the RF signal or the first-IF signal.

(9)

The receiving apparatus according to (7) described above, further including:

a TV device.

(10)

The receiving apparatus according to (7) described above, further including:

a set top box.

REFERENCE SIGNS LIST

101 RF input terminal
102 first-IF input terminal
103, 104 RFVGA
105, 105-1 to 105-n RF filter
106 RF filter
107 MIX
108 Complex-filter/LPF
109 Switch
110 IQ combiner
111 Switch
112 IFVGA
113, 114 BBVGA
115 IF signal output terminal
116 BB(I) signal output terminal
117 BB(Q) output terminal
201 Broadcast receiving system
211 Terrestrial broadcasting antenna
212 Satellite digital broadcasting antenna
213 Receiving apparatus
214 Display
221 Tuner
222 Demodulation unit
223 Processing unit
224 Control unit
301, 302 LNA
303 to 306 Switch
401 Complex BPF
402, 403 LPF

The invention claimed is:

1. A semiconductor chip, comprising:
an RF input terminal to receive an RF signal of terrestrial broadcasting, the RF signal having a first frequency;
a first-IF input terminal to receive a first-IF signal of satellite digital broadcasting, the first-IF signal having a second frequency;
a first filter configured to filter a signal in a first frequency band lower than a predetermined frequency representing a boundary between a first frequency band of the terrestrial broadcasting and a second frequency band of the satellite digital broadcasting, wherein the predetermined frequency is independent of a desired frequency selected by a user;
a second filter configured to filter a signal in a second frequency band equal to or higher than the predetermined frequency; and
a first switch configured to cause the RF signal to be input to the first filter or to the second filter by switching according to only the first frequency of the received RF signal and the predetermined frequency, and a second switch configured to cause the first-IF signal to be input to the first filter or to the second filter by switching according to only the second frequency of the received first-IF signal and the predetermined frequency.

2. The semiconductor chip according to claim 1, further comprising:
at least one LNA circuit configured to amplify the RF signal or the first-IF signal, the at least one LNA circuit being provided at a stage preceding the switch.

3. The semiconductor chip according to claim 1, further comprising:
an RFVGA circuit configured to change a gain of the RF signal and the first-IF signal according to a signal level, the RFVGA circuit being provided at a stage preceding the first filter and the second filter.

4. The semiconductor chip according to claim 1, further comprising:
a frequency conversion circuit configured to perform frequency conversion on the RF signal to generate an IF signal having a frequency lower than the frequency of the RF signal, and perform frequency conversion on the first-IF signal to generate a baseband BB signal; and
at least one output terminal configured to output the IF signal or the BB signal.

5. The semiconductor chip according to claim 4, wherein the frequency conversion circuit is further configured to output, as the IF signal, an IF(I) signal and an IF(Q) signal whose phases are orthogonal to each other, and output, as the BB signal, a BB(I) signal and a BB(Q) signal whose phases are orthogonal to each other, and
the output terminal includes a first output terminal configured to output a signal obtained by synthesizing the IF(I) signal and the IF(Q) signal as the IF signal, a second output terminal configured to output the BB(I) signal as one of the BB signals, and a third output terminal configured to output the BB(Q) signal as the other of the BB signals.

6. The semiconductor chip according to claim 4, further comprising:
a filter circuit configured to limit a signal band of the IF signal and the BB signal; and
a VGA circuit that is disposed at a stage preceding the output terminal and configured to change a gain of the IF signal and the BB signal according to a signal level after the frequency conversion.

7. A receiving apparatus, comprising:
a tuner including:
an RF input terminal to receive an RF signal of terrestrial broadcasting, the RF signal having a first frequency;
a first-IF input terminal to receive a first-IF signal of satellite digital broadcasting is input the first-IF signal having a second frequency;
a first filter configured to filter a signal in a first frequency band lower than a predetermined frequency representing a boundary between a first frequency band of the terrestrial broadcasting and a second frequency band of the satellite digital broadcasting, wherein the predetermined frequency is independent of a desired frequency selected by a user;

a second filter configured to filter a signal in a second frequency band equal to or higher than the predetermined frequency; and a first switch configured to cause the RF signal to be input to the first filter or to the second filter by switching according to the first frequency of the received RF signal, and a second switch configured to cause the first-IF signal to be input to the first filter or to the second filter by switching according to the second frequency of the received first-IF signal; and a control circuit configured to first determine whether the frequency of the RF signal is greater than the predetermined frequency and control the first switch based on the first determination, and second determine whether the frequency of the first-IF signal is greater than the predetermined frequency and control the second switch based on the second determination.

8. The receiving apparatus according to claim 7, wherein the tuner further includes, at a stage preceding the first switch and the second switch, at least one LNA circuit that amplifies the RF signal or the first-IF signal.

9. The receiving apparatus according to claim 7, further comprising:

a TV device.

10. The receiving apparatus according to claim 7, further comprising:

a set top box.

* * * * *